United States Patent
Nitta

(10) Patent No.: US 10,802,253 B2
(45) Date of Patent: Oct. 13, 2020

(54) IMAGING LENS

(71) Applicant: KANTATSU CO., LTD., Tochigi (JP)

(72) Inventor: Koji Nitta, Tokyo (JP)

(73) Assignee: KANTATSU CO., LTD., Tochigi (JP)

( * ) Notice: Subject to any disclaimer, the term of this patent is extended or adjusted under 35 U.S.C. 154(b) by 0 days.

(21) Appl. No.: 16/009,881

(22) Filed: Jun. 15, 2018

(65) Prior Publication Data
US 2019/0154966 A1 May 23, 2019

(30) Foreign Application Priority Data
Jun. 15, 2017 (JP) .................................. 2017-118160

(51) Int. Cl.
*G02B 13/00* (2006.01)
*G02B 9/62* (2006.01)
*G02B 27/00* (2006.01)
*H04N 5/225* (2006.01)
*G02B 7/04* (2006.01)

(52) U.S. Cl.
CPC ........... *G02B 13/0045* (2013.01); *G02B 7/04* (2013.01); *G02B 9/62* (2013.01); *G02B 27/0025* (2013.01); *H04N 5/2254* (2013.01)

(58) Field of Classification Search
CPC .... G02B 13/0045; G02B 13/04; G02B 13/06; G02B 13/16; G02B 9/62
USPC ........................................ 359/713, 761, 762
See application file for complete search history.

(56) References Cited

U.S. PATENT DOCUMENTS

| 8,385,008 B2* | 2/2013 | Hsieh | G02B 13/0045 359/751 |
|---|---|---|---|
| 8,743,477 B2* | 6/2014 | Tsai | G02B 9/62 359/713 |
| 8,780,464 B2* | 7/2014 | Huang | G02B 13/0045 359/762 |
| 9,374,513 B2* | 6/2016 | Chen | H04N 5/2253 |
| 9,541,737 B2* | 1/2017 | Chen | G02B 13/18 |
| 9,557,534 B1* | 1/2017 | Liao | G02B 13/0045 |
| 9,568,710 B2* | 2/2017 | Chen | G02B 13/0045 |
| 9,927,597 B2* | 3/2018 | Lee | G02B 13/0045 |
| 9,952,409 B2* | 4/2018 | Lee | G02B 9/62 |
| 2012/0243108 A1 | 9/2012 | Tsai | |

(Continued)

FOREIGN PATENT DOCUMENTS

| CN | 104238082 A | 12/2014 |
|---|---|---|
| CN | 104238083 A | 12/2014 |

(Continued)

*Primary Examiner* — Zachary W Wilkes
(74) *Attorney, Agent, or Firm* — Hamre Schumann, Mueller & Larson, P.C.

(57) ABSTRACT

There is provided an imaging lens with high resolution which satisfies in well balance wide field of view, low-profileness and low F-number and properly corrects aberrations. An imaging lens comprises a first lens having negative refractive power, a second lens having the negative refractive power, a third lens, a fourth lens having the negative refractive power and a convex surface facing the image side near an optical axis, a fifth lens having at least one aspheric surface, and a sixth lens being double-sided aspheric lens and having a concave surface facing the image side near the optical axis, wherein the image-side surface of the sixth lens is an aspheric surface changing to the convex surface at a peripheral area.

19 Claims, 6 Drawing Sheets

(56) References Cited

U.S. PATENT DOCUMENTS

| | | | |
|---|---|---|---|
| 2015/0346459 A1 | 12/2015 | Chen et al. | |
| 2015/0346460 A1 | 12/2015 | Chen et al. | |
| 2015/0346461 A1 | 12/2015 | Chen et al. | |
| 2018/0252897 A1* | 9/2018 | Hsueh | G02B 13/04 |
| 2019/0154974 A1* | 5/2019 | Chen | G02B 9/64 |

FOREIGN PATENT DOCUMENTS

| | | |
|---|---|---|
| CN | 104238074 B | 11/2016 |
| JP | 2015-125405 | 7/2015 |

\* cited by examiner

IMAGING LENS

The present application is based on and claims priority of a Japanese patent application No. 2017-118160 filed on Jun. 15, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly to an imaging lens which is built in an imaging device mounted in an increasingly compact and low-profile smartphone and mobile phone, an information terminal such as a PDA (Personal Digital Assistant), a game console, PC and a robot, and moreover, a home appliance and an automobile with camera function.

Description of the Related Art

In recent years, it becomes common that camera function is mounted in a home appliance, information terminal equipment, an automobile and public transportation. Demand of products with the camera function is more increased, and development of products is being made accordingly.

The imaging lens mounted in such equipment is required to be compact and to have high-resolution performance. For Example, Patent Document 1 (JP2015-125405A) and Patent Document 2 (US2012/0243108A) disclose the imaging lens comprising six lenses.

Patent Document 1 discloses an imaging lens comprising, in order from an object side, a first lens having negative refractive power, a second lens, a third lens, a fourth lens, a fifth lens, and a sixth lens having at least one aspheric surface.

Patent Document 2 discloses an imaging lens comprising, in order from an object side, a first lens having a convex surface facing the object side and positive refractive power, a second lens, a third lens, a fourth lens having at least one aspheric surface, a fifth lens having the convex surface facing the object side and a concave surface facing an image side, and a sixth lens having the concave surface facing the image side and at least one aspheric surface.

However, with the lens configuration disclosed in the Patent Document 1, when low-profileness and low F-number are realized, it is very difficult to correct aberration at a peripheral area, and excellent optical performance is can not be obtained.

With the lens configuration disclosed in the Patent Document 2, when wide field of view, the low-profileness and the low F-number are realized, it is very difficult to correct aberration at the peripheral area, and excellent optical performance can not be obtained.

The present invention has been made in view of the above-described problems, and an object of the present invention is to provide an imaging lens with high resolution which satisfies requirement of the wide field of view, the low-profileness and the low F-number in well balance and properly corrects aberrations.

Regarding terms used in the present invention, a convex surface, a concave surface or a plane surface of lens surfaces implies that a shape of the lens surface near an optical axis (paraxial portion), refractive power implies the refractive power near the optical axis (paraxial portion). The pole point implies an off-axial point on an aspheric surface at which a tangential plane intersects the optical axis perpendicularly. The total track length is defined as a distance along the optical axis from an object-side surface of an optical element located closest to the object to an image plane, when thickness of an IR cut filter or a cover glass which may be arranged between the imaging lens and the image plane is regarded as an air.

An imaging lens according to the present invention which forms an image of an object on a solid-state image sensor, comprises in order from an object side to an image side, a first lens having negative refractive power, a second lens having the negative refractive power, a third lens, a fourth lens having the negative refractive power and a convex surface facing the image side near an optical axis, a fifth lens having at least one aspheric surface, and a sixth lens being double-sided aspheric lens and having a concave surface facing the image side near the optical axis, wherein the image-side surface of the sixth lens is an aspheric surface changing to the convex surface at a peripheral area.

With the above-described configuration, the first lens achieves wide field of view of an optical system by having the negative refractive power. The second lens has the negative refractive power, achieves the wide field of view by appropriately balancing the negative refractive power and the first lens, and properly corrects astigmatism and coma aberration. The third lens corrects spherical aberration while maintaining low-profileness. The fourth lens corrects chromatic aberration and astigmatism by having the negative refractive power. Additionally, by having the convex surface facing the image side near the optical axis, a light ray incident angle to the peripheral area of the lens is controlled and the coma aberration is properly corrected. The fifth lens properly corrects the astigmatism occurred in association with the wide field of view. Furthermore, by having at least one aspheric surface, the effect thereof can be further improved. The sixth lens secures back focus while maintaining the low-profileness and an image-side surface is a concave surface facing the image side near the optical axis. By forming the image-side surface thereof as the aspheric surface changing to the convex surface at a peripheral area, correction of field curvature and distortion, and control of the light ray incident angle to an image sensor are realized.

According to the imaging lens having the above-described configuration, it is preferable that the object-side surface of the first lens is the concave surface facing the object side near the optical axis.

When the object-side surface of the first lens is the concave surface facing the object side near the optical axis, position of Principal Point can be moved toward the image side and required back focus is secured even if a focal length of an overall optical system is shortened.

According to the imaging lens having the above-described configuration, it is preferable that the image-side surface of the first lens is the convex surface facing the image side near the optical axis.

When that the image-side surface of the first lens is the convex surface facing the image side near the optical axis, the position of Principal Point can be moved toward the image side and more appropriate back focus is secured.

According to the imaging lens having the above-described configuration, it is preferable that the object-side surface of the first lens is the aspheric surface changing to the convex surface at a peripheral area.

The peripheral area of the object-side surface of the first lens has the convex surface, therefore, a light ray enters to the peripheral area of the first lens at an angle near a normal line of the lens surface. Thereby, high-order aberration can be properly corrected. When the object-side surface of the first lens is the convex surface having a pole point, an amount of SAG is reduced and the low-profileness can be realized. Furthermore, such shape becomes symmetrical with respect to the shape of the image-side surface of the last sixth lens, and proper correction of the distortion can be made.

According to the imaging lens having the above-described configuration, it is preferable that the image-side surface of the first lens is the aspheric surface changing to the concave surface at a peripheral area.

The peripheral area of the image-side surface of the first lens has the concave surface, therefore, a light ray is emitted from the peripheral area of the first lens at an angle near a normal line of the lens surface. Thereby, the high-order aberration can be properly corrected. When the image-side surface of the first lens is the concave surface having a pole point, an amount of SAG is reduced and the low-profileness can be realized. Furthermore, such shape becomes symmetrical with respect to the shape of the object-side surface of the last sixth lens, and proper correction of the distortion can be made.

According to the imaging lens having the above-described configuration, it is preferable that the second lens has a meniscus shape having the concave surface facing the image side near the optical axis.

When the second lens has the meniscus shape having the concave surface facing the image side near the optical axis, the wide field of view, and proper correction of the spherical aberration and the coma aberration can be realized.

According to the imaging lens having the above-described configuration, it is preferable that the third lens has a biconvex shape having the convex surfaces facing both sides near the optical axis.

When the third lens has the biconvex shape, the low-profileness can be achieved by the positive refractive power of the object-side and the image-side surfaces. When a lens having main positive refractive power is arranged in the vicinity of a middle area of the optical system, the aberrations over the optical system can be easily balanced. Furthermore, when the both-side surfaces are convex, curvature is suppressed not to be large, and sensitivity to manufacturing error can be reduced.

According to the imaging lens having the above-described configuration, it is preferable that the fourth lens has the meniscus shape having the concave surface facing the object side near the optical axis.

When the fourth lens has the meniscus shape having the concave surface facing the object side near the optical axis, the light ray incident angle to the fourth lens is appropriately controlled, and the chromatic aberration and the astigmatism are properly corrected.

According to the imaging lens having the above-described configuration, it is preferable that the fifth lens has the meniscus shape having the concave surface facing the object side near the optical axis.

When the fifth lens has the meniscus shape having the concave surface facing the object side near the optical axis, the light ray incident angle to the fifth lens is appropriately controlled, and the astigmatism which is increased in association with the wide field of view can properly corrected.

According to the imaging lens having the above-described configuration, it is preferable that the object-side surface of the sixth lens is the convex surface facing the object side near the optical axis, and is the aspheric surface changing to the concave surface at the peripheral area.

When the object-side surface of the sixth lens is the convex surface facing the object side near the optical axis, namely the sixth lens has the meniscus shape near the optical axis, the back focus is easily secured. When the peripheral area of the object-side surface of the sixth lens has the concave surface having the pole point, the light ray incident angle to the image sensor can be appropriately controlled. By gradually changing from the convex surface to the concave surface, proper correction of the field curvature at an intermediate image height is made.

According to the imaging lens having the above-described configuration, it is preferable that a below conditional expression (1) is satisfied:

$$0.15 < vd1/(vd2+vd3) < 0.50 \quad (1)$$

where
vd1: abbe number at d-ray of the first lens,
vd2: abbe number at d-ray of the second lens, and
vd3: abbe number at d-ray of the third lens.

The conditional expression (1) defines relationship between the abbe numbers at d-ray of the first lens, the second lens and the third lens, and is a condition for properly correcting axial chromatic aberration. By satisfying the conditional expression (1), the axial chromatic aberration is properly corrected.

According to the imaging lens having the above-described configuration, it is preferable that a below conditional expression (2) is satisfied:

$$0.15 < vd4/vd5 < 0.55 \quad (2)$$

where
vd4: abbe number at d-ray of the fourth lens, and
vd5: abbe number at d-ray of the fifth lens.

The conditional expression (2) defines relationship between the abbe numbers at d-ray of the fourth lens and the fifth lens and the third lens, and is a condition for properly correcting chromatic aberration of magnification. By satisfying the conditional expression (2), the chromatic aberration of magnification is properly corrected.

According to the imaging lens having the above-described configuration, it is preferable that a below conditional expression (3) is satisfied:

$$-32 < f1/f < -7 \quad (3)$$

where
f1: focal length of the first lens, and
f: focal length of the overall optical system of the imaging lens.

The conditional expression (3) defines a scope of the focal length of the first lens to the focal length of the overall optical system of the imaging lens, and is a condition for achieving the low-profileness and wide field of view. When a value is below the upper limit of the conditional expression (3), the negative refractive power of the first lens becomes appropriate, and the low-profileness can be achieved. On the other hand, when the value is above the lower limit of the conditional expression (3), the wide field of view can be realized.

According to the imaging lens having the above-described configuration, it is preferable that composite refractive power of the first lens and the second lens is negative, and moreover, a below conditional expression (4) is satisfied:

$$-28 < f12/f < -6 \quad (4)$$

where
f12: composite focal length of the first lens and the second lens, and f: focal length of the overall optical system of the imaging lens.

When the composite refractive power of the first lens and the second lens is negative, the wide field of view is more facilitated. The conditional expression (4) defines a scope of the composite focal length of the first lens and the second lens to the focal length of the overall optical system of the imaging lens, and is a condition for the low-profileness and the proper aberration correction. When a value is below the upper limit of the conditional expression (4), the negative composite refractive power of the first lens and the second lens becomes appropriate, and correction of the spherical aberration and the astigmatism becomes facilitated. Furthermore, the low-profileness can be also achieved. On the other hand, when the value is above the lower limit of the conditional expression (4), the wide field of view can be realized.

According to the imaging lens having the above-described configuration, it is preferable that the refractive power of the third lens is positive, and moreover, a below conditional expression (5) is satisfied:

$$0.35 < f3/f < 1.20 \qquad (5)$$

where
f3: focal length of the third lens, and
f: focal length of the overall optical system of the imaging lens.

When the third lens has the positive refractive power, the low-profileness is more facilitated. The conditional expression (5) defines a scope of the focal length of the third lens to the focal length of the overall optical system of the imaging lens, and is a condition for achieving the low-profileness and the proper aberration correction. When a value is below the upper limit of the conditional expression (5), the positive refractive power of the third lens becomes appropriate, and the low-profileness can be achieved. On the other hand, when the value is above the lower limit of the conditional expression (5), the spherical aberration and the coma aberration can be properly corrected.

According to the imaging lens having the above-described configuration, it is preferable that a below conditional expression (6) is satisfied:

$$-2.5 < f4/f < -0.6 \qquad (6)$$

where
f4: focal length of the fourth lens, and
f: focal length of the overall optical system of the imaging lens.

The conditional expression (6) defines a scope of the focal length of the fourth lens to the focal length of the overall optical system of the imaging lens, and is a condition for achieving the proper aberration correction. When a value is below the upper limit of the conditional expression (6), the negative refractive power of the fourth lens becomes appropriate, and the spherical aberration can be properly corrected. On the other hand, when the value is above the lower limit of the conditional expression (6), the chromatic aberration and the astigmatism can be properly corrected.

According to the imaging lens having the above-described configuration, it is preferable that a below conditional expression (7) is satisfied:

$$10 < |f5|/f \qquad (7)$$

where
f5: focal length of the fifth lens, and
f: focal length of the overall optical system of the imaging lens.

The conditional expression (7) defines a scope of the focal length of the fifth lens to the focal length of the overall optical system of the imaging lens, and is a condition for achieving the low-profileness and the proper aberration correction. When the value is above the lower limit of the conditional expression (7), the chromatic aberration is corrected, total track length is shortened and the field curvature can be properly corrected.

According to the imaging lens having the above-described configuration, it is preferable that the refractive power of the sixth lens is positive, and moreover, a below conditional expression (8) is satisfied:

$$1.0 < f6/f < 6.5 \qquad (8)$$

where
f6: focal length of the sixth lens, and
f: focal length of the overall optical system of the imaging lens.

When the sixth lens has the positive refractive power, the low-profileness is more facilitated. The conditional expression (8) defines a scope of the focal length of the sixth lens to the focal length of the overall optical system of the imaging lens, and is a condition for achieving the low-profileness and the proper aberration correction. When a value is below the upper limit of the conditional expression (8), the positive refractive power of the sixth lens becomes appropriate, and the low-profileness can be achieved. On the other hand, when the value is above the lower limit of the conditional expression (8), the field curvature and the distortion can be properly corrected.

According to the imaging lens having the above-described configuration, it is preferable that a below conditional expression (9) is satisfied:

$$2 < (D4/TTL) \times 100 < 10 \qquad (9)$$

where
D4: thickness along the optical axis of the fourth lens, and
TTL: distance along the optical axis from an object-side surface of the first lens to an image plane.

The conditional expression (9) defines an appropriate thickness along the optical axis of the fourth lens, and is a condition for maintaining proper formability of the fourth lens and achieving the low-profileness. When a value is below the upper limit of the conditional expression (9), the thickness along the optical axis of the fourth lens is prevented from being excessively large, and securing an air gap of the object side and the image side of the fourth lens is facilitated. Therefore, the low-profileness can be maintained. On the other hand, when the value is above the lower limit of the conditional expression (9), the thickness along the optical axis of the fourth lens is prevented from being excessively small, and the formability of the lens becomes proper.

According to the imaging lens having the above-described configuration, it is preferable that a below conditional expression (10) is satisfied:

$$0.6 < \Sigma(L1F-L6R)/f < 2.4 \qquad (10)$$

where
$\Sigma(L1F-L6R)$: distance along the optical axis from the object-side surface of the first lens to the image-side surface of the sixth lens, and
f: focal length of the overall optical system of the imaging lens.

The conditional expression (10) defines the distance along the optical axis from the object-side surface of the first lens to the image-side surface of the sixth lens to the focal length of the overall optical system of the imaging lens, and is a condition for achieving the low-profileness and proper aberration correction. When a value is below the upper limit of the conditional expression (10), the back focus is secured and space for arranging a filter is also secured. On the other hand, when the value is above the lower limit of the conditional expression (10), thickness of each lens which imaging lens comprises is easily secured. Furthermore, each interval of lenses can be appropriately determined, and the freedom in the aspheric surface is improved. Therefore, the proper aberration correction can be made.

According to the imaging lens having the above-described configuration, it is preferable that a below conditional expression (11) is satisfied:

$$0.40 < T2/T3 < 1.80 \quad (11)$$

where

T2: distance along the optical axis from the image-side surface of the second lens to the object-side surface of the third lens, and T3: distance along the optical axis from the image-side surface of the third lens to the object-side surface of the fourth lens.

The conditional expression (11) defines a ratio of an interval between the second lens and the third lens, and an interval between the third lens and the fourth lens, and is a condition for achieving the low-profileness and the proper aberration correction. By satisfying the conditional expression (11), difference between the interval of the second lens and the third lens and the interval of the third lens and the fourth lens is suppressed not to be increased, and the low-profileness is achieved. Furthermore, by satisfying the conditional expression (11), the third lens is arranged at an optimum position, and aberration correction function of the lens becomes more effective.

According to the imaging lens having the above-described configuration, it is preferable that a below conditional expression (12) is satisfied:

$$0.2 < r12/f < 0.9 \quad (12)$$

where r12: paraxial curvature radius of the image-side surface of the sixth lens, and f: focal length of the overall optical system of the imaging lens.

The conditional expression (12) defines a shape near the optical axis of the image-side surface of the sixth lens, and is a condition for securing the back focus and achieving the low-profileness. By satisfying the conditional expression (12), the appropriate back focus is secured and the low-profileness can be achieved.

According to the imaging lens having the above-described configuration, it is preferable that a below conditional expression (13) is satisfied:

$$Fno \leq 2.4 \quad (13)$$

where

Fno: F-number.

The conditional expression (13) defines the F-number. When a value is below the upper limit of the conditional expression (13), brightness required for the imaging lens in recent years can be fully secured, if it is mounted in a portable mobile device, a digital camera, a monitoring camera, or an onboard camera.

Effect of Invention

According to the present invention, there can be provided an imaging lens with high resolution which satisfies requirement of the wide field of view, the low-profileness and the low F-number in well balance, and properly corrects aberrations.

DETAILED DESCRIPTION OF THE PREFERRED EMBODIMENT

Hereinafter, the preferred embodiment of the present invention will be described in detail referring to the accompanying drawings.

Figure 1:
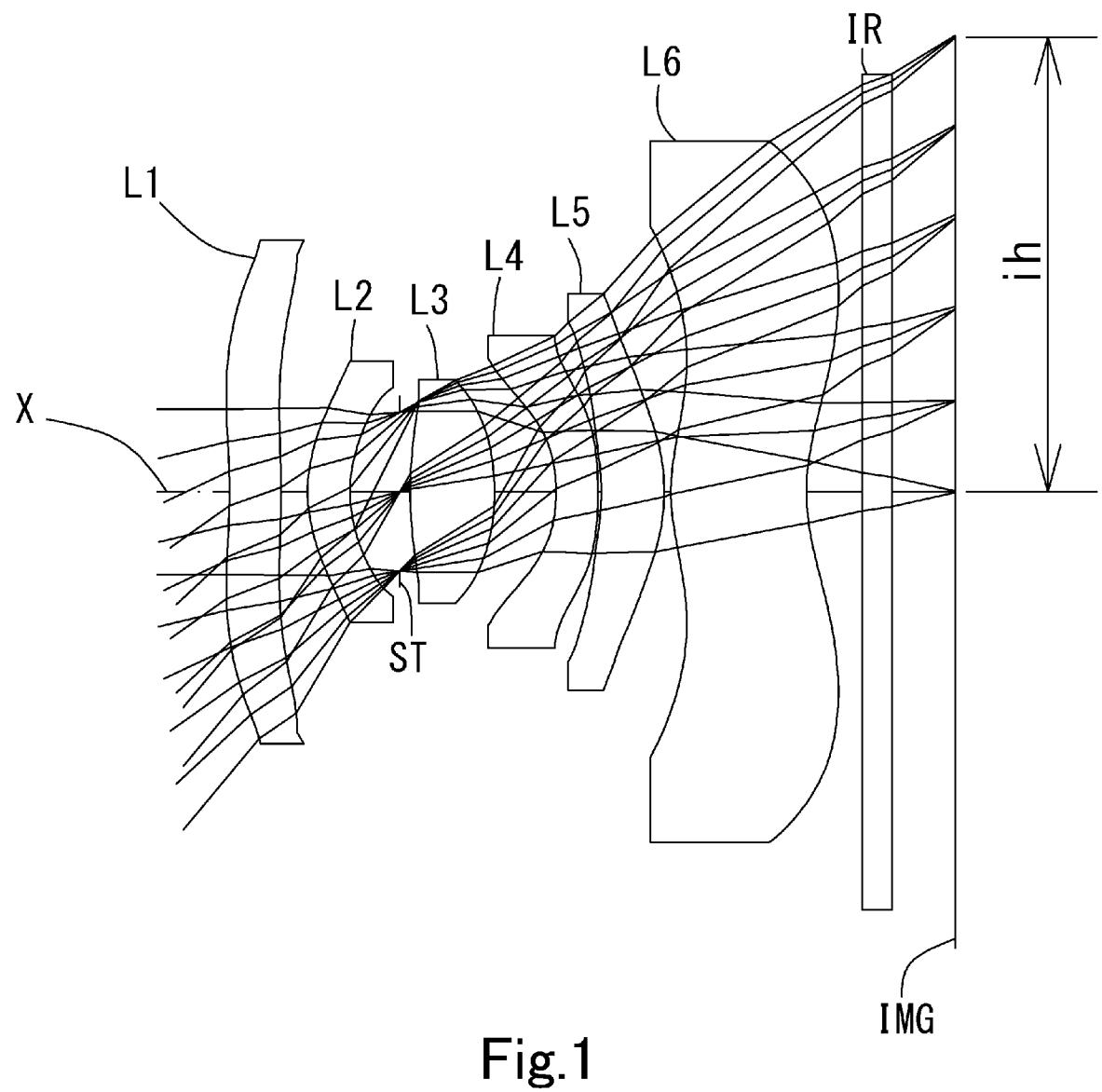
FIG. 1 is a schematic view showing a general configuration of an imaging lens in Example 1 according to the present invention.
Figure 3:
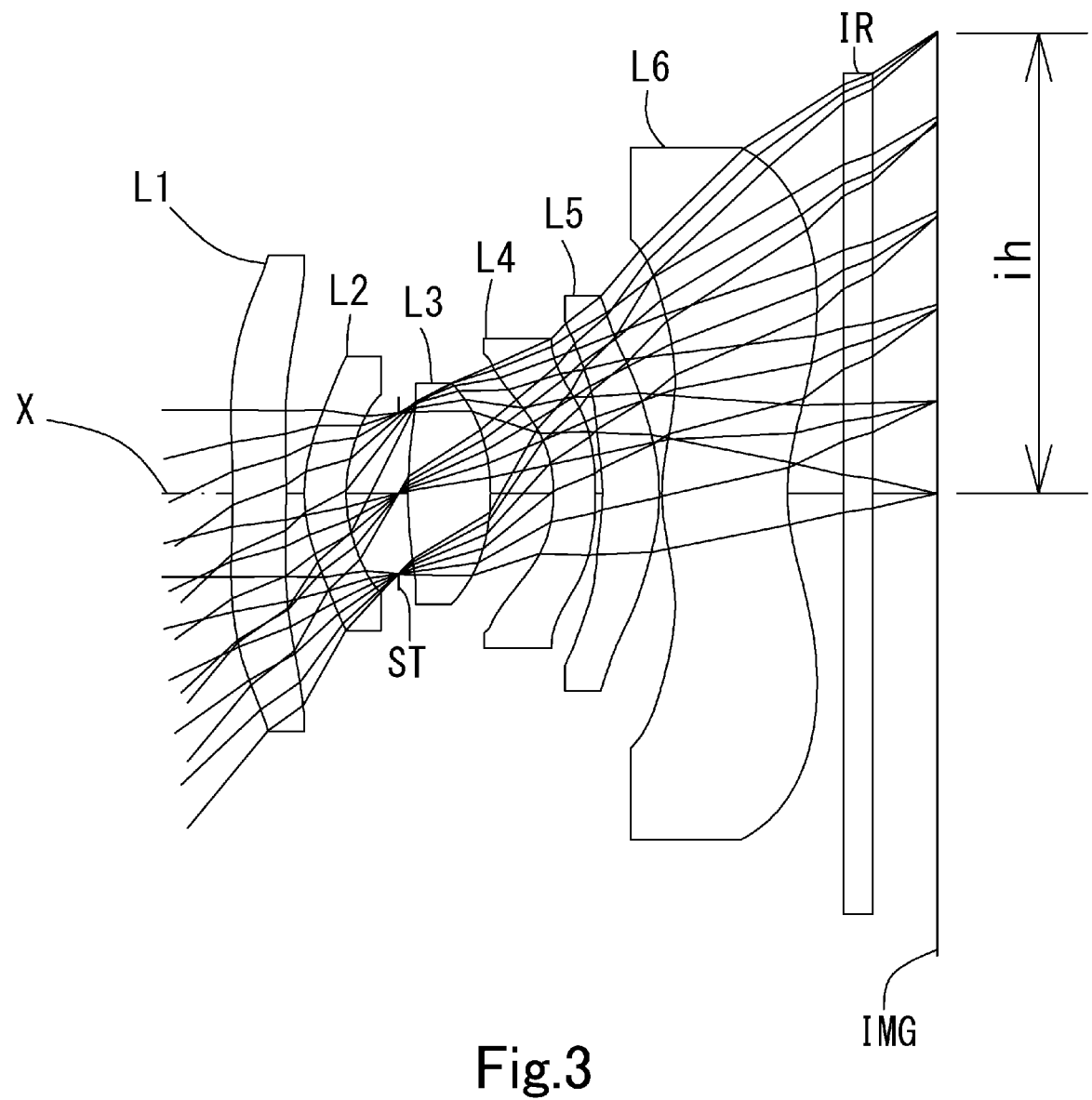
FIG. 3 is a schematic view showing the general configuration of an imaging lens in Example 2 according to the present invention.
Figure 5:
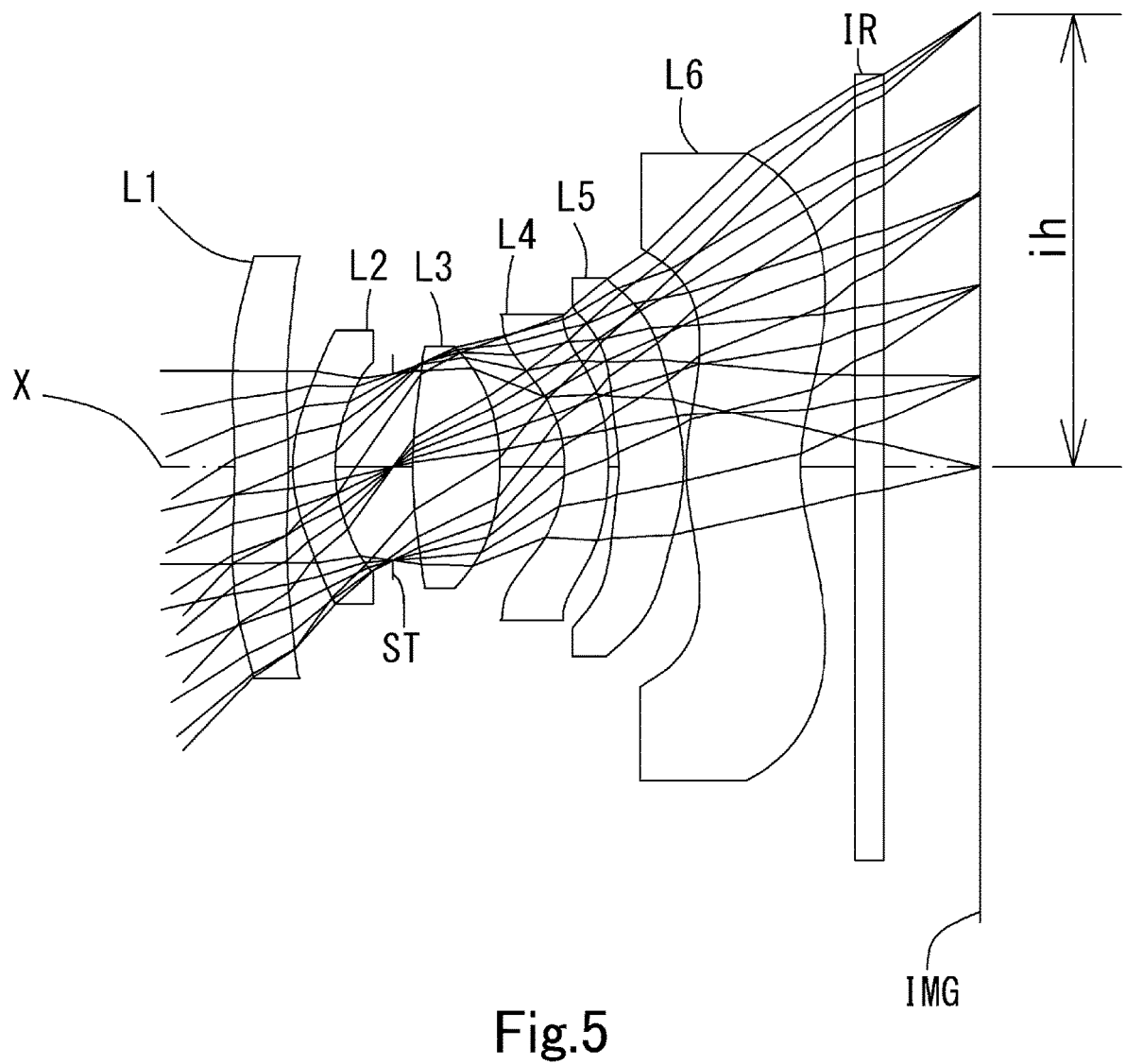
FIG. 5 is a schematic view showing the general configuration of an imaging lens in Example 3 according to the present invention.

FIGS. 1, 3 and 5 are schematic views of the imaging lenses in Examples 1 to 3 according to the embodiments of the present invention, respectively.

As shown in FIG. 1, the imaging lens according to the present embodiments comprises in order from an object side to an image side, a first lens L1 having negative refractive power, a second lens L2 having the negative refractive power, an aperture stop ST, a third lens L3, a fourth lens L4 having the negative refractive power and a convex surface facing the image side near an optical axis X, a fifth lens L5 having at least one aspheric surface, and a sixth lens L6 being double-sided aspheric lens and having a concave surface facing the image side near the optical axis, wherein the image-side surface of the sixth lens L6 is an aspheric surface changing to the convex surface toward the image side at a peripheral area.

A filter IR such as an IR cut filter and a cover glass are arranged between the sixth lens L6 and an image plane IMG (namely, an image plane of the image sensor). The filter IR is omissible.

The first lens L1 has the negative refractive power, and occurrence of aberrations is suppressed by the aspheric surfaces on both sides and the wide field of view of the imaging lens is achieved. The first lens L1 has a meniscus shape having a concave surface facing the object side near the optical axis X, and position of Principal Point can be moved toward the image side. Therefore, required back focus is secured even if a focal length of an overall optical system is shortened corresponding to the wide field of view.

The object-side surface of the first lens L1 is the aspheric surface changing to the convex surface at the peripheral area, and the image-side surface is the aspheric surface changing to the concave surface at the peripheral area. The convex surface at the peripheral area of the object-side surface has a pole point, and the concave surface at the peripheral area of the image-side surface also has a pole point.

Such aspheric surfaces are provided, therefore a light ray enters to the peripheral area at an angle near a normal line of the lens surface of the object side, and is emitted at an angle near the normal line of the lens surface of the image side. Thereby, occurrence of high-order aberration is suppressed. By providing the pole point, an amount of SAG is reduced and the contribution to low-profileness is made. Furthermore, such lens shape becomes symmetrical with respect to the shape of the last sixth lens L6, and proper correction of the distortion can be made.

The second lens L2 has the negative refractive power and the meniscus shape having the concave surface facing the image side near the optical axis X, and the wide field of view of the imaging lens can be realized while properly correcting the spherical aberration, astigmatism and the coma aberration.

The aperture stop ST is arranged between the second lens L2 and the third lens L3, namely in the vicinity of a middle area of the optical system. Symmetry with the aperture stop ST is occurred, and the distortion increased in association with the wide field of view is suppressed to be small.

The third lens L3 has the positive refractive power and the biconvex shape which the object-side and the image-side surfaces are convex near the optical axis X. The third lens L3 has the biconvex shape, therefore the low-profileness can be achieved. Furthermore, when a lens having main positive refractive power is arranged in the vicinity of a middle area of the optical system, the aberrations over the optical system can be easily balanced. Additionally, when the both-side surfaces are convex, curvature is suppressed not to be large, and sensitivity to manufacturing error can be reduced.

The fourth lens L4 has the negative refractive power, and properly corrects the chromatic aberration, the astigmatism and the coma aberration. The fourth lens L4 has the meniscus shape having the concave surface facing the object side near the optical axis X, therefore the light ray incident angle to the fourth lens L4 is appropriately controlled, and the chromatic aberration and the astigmatism are properly corrected.

The fifth lens L5 has the positive refractive power, and properly corrects the astigmatism occurred in association with the wide field of view by at least one aspheric surface. The fifth lens L5 has the meniscus shape having the concave surface facing the object side near the optical axis X, therefore, the light ray incident angle to the fifth lens L5 is appropriately controlled and the astigmatism is properly corrected. The refractive power of the fifth lens L5 may be negative as shown in FIG. 3.

The sixth lens L6 is a double-sided aspheric lens having the positive refractive power and the meniscus shape having the concave surface facing the image side near the optical axis X, and secures the back focus while maintaining the low-profileness. The aspheric surface of the image side is provided in a manner that the image-side surface has the concave surface facing the image side near the optical axis X and changes to the convex surface facing the image side at the peripheral area. Therefore, correction of the field curvature and distortion, and control of the light ray incident angle to an image sensor are appropriately made. The aspheric surface of the object side of the sixth lens L6 is provided in a manner that the object-side surface has the convex surface facing the object side near the optical axis X and changes to the concave surface facing the object side at the peripheral area. Therefore, as well as the image side, the light ray incident angle to an image sensor is appropriately controlled. By gradually changing from the convex surface to the concave surface, proper correction of the field curvature at an intermediate image height is made.

Regarding the imaging lens according to the present embodiments, for example as shown in FIG. 1, it is preferable that all lenses of the first lens L1 to the sixth lens L6 are single lenses which are not cemented each other. Configuration without the cemented lens can frequently use the aspheric surfaces, and proper correction of the aberrations can be realized. Furthermore, workload for cementing is reduced, and manufacturing in low cost becomes possible.

Regarding the imaging lens according to the present embodiments, a plastic material is used for all of the lenses, and manufacturing is facilitated and mass production in a low cost can be realized. Both-side surfaces of all lenses are appropriate aspheric, and the aberrations are favorably corrected.

The material applied to the lens is not limited to the plastic material. By using glass material, further high performance may be aimed. All of surfaces of lenses are preferably formed as aspheric surfaces, however, spherical surfaces may be adopted which is easy to manufacture in accordance with required performance.

The imaging lens according to the present embodiments shows preferable effect by satisfying the below conditional expressions (1) to (13).

$$0.15 < vd1/(vd2+vd3) < 0.50 \quad (1)$$

$$0.15 < vd4/vd5 < 0.55 \quad (2)$$

$$-32 < f1/f < -7 \quad (3)$$

$$-28 < f2/f < -6 \quad (4)$$

$$0.35 < f3/f < 1.20 \quad (5)$$

$$-2.5 < f4/f < -0.6 \quad (6)$$

$$10 < |f5|/f \quad (7)$$

$$1.0 < f6/f < 6.5 \quad (8)$$

$$2 < (D4/TTL) \times 100 < 10 \quad (9)$$

$$0.6 < \Sigma(L1F-L6R)/f < 2.4 \quad (10)$$

$$0.40 < T2/T3 < 1.80 \quad (11)$$

$$0.2 < r12/f < 0.9 \quad (12)$$

$$Fno \leq 2.4 \quad (13)$$

where
vd1: abbe number at d-ray of the first lens L1,
vd2: abbe number at d-ray of the second lens L2,
vd3: abbe number at d-ray of the third lens L3,
vd4: abbe number at d-ray of the fourth lens L4,
vd5: abbe number at d-ray of the fifth lens L5,
T2: distance along the optical axis X from the image-side surface of the second lens L2 to the object-side surface of the third lens L3,
T3: distance along the optical axis X from the image-side surface of the third lens L3 to the object-side surface of the fourth lens L4,
TTL: distance along the optical axis X from an object-side surface of the first lens L1 to an image plane IMG,
f: focal length of the overall optical system of the imaging lens, f1: focal length of the first lens L1,
f3: focal length of the third lens L3,
f4: focal length of the fourth lens L4,
f5: focal length of the fifth lens L5,
f6: focal length of the sixth lens L6,
f12: composite focal length of the first lens L1 and the second lens L2,
D4: thickness along the optical axis X of the fourth lens L4,
Σ(L1F-L6R): distance along the optical axis X from the object-side surface of the first lens L1 to the image-side surface of the sixth lens L6,
r12: paraxial curvature radius of the image-side surface of the sixth lens L6, and
Fno: F-number.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (13a).

$$0.20 < vd1/(vd2+vd3) < 0.40 \tag{1a}$$

$$0.25 < vd4/vd5 < 0.45 \tag{2a}$$

$$-27 < f1/f < -11 \tag{3a}$$

$$-23 < f12/f < -10 \tag{4a}$$

$$0.50 < f3/f < 1.00 \tag{5a}$$

$$-2.0 < f4/f < -1.0 \tag{6a}$$

$$16 < |f5|/f \tag{7a}$$

$$1.65 < f6/f < 5.20 \tag{8a}$$

$$4 < (D4/TTL) \times 100 < 8 \tag{9a}$$

$$1.00 < \Sigma(L1F-L6R)/f < 1.95 \tag{10a}$$

$$0.70 < T2/T3 < 1.50 \tag{11a}$$

$$0.35 < r12/f < 0.70 \tag{12a}$$

$$Fno \leq 2.3 \tag{13a}$$

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a curvature radius, k denotes a conic constant, and A4, A6, A8, A10, A12, A14 and A16 denote aspheric surface coefficients.

$$Z = \frac{\frac{H^2}{R}}{1+\sqrt{1-(k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

Next, examples of the imaging lens according to this embodiment will be explained. In each example, f denotes the focal length of the overall optical system of the imaging lens, Fno denotes an F-number, w denotes a half field of view, and ih denotes a maximum image height. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1
Unit mm
f = 2.67
Fno = 2.2
ω(°) = 50.0
ih = 3.26
TTL = 5.10

Surface Data

| Surface Number i | Curvature Radius r | Surface Distance d | Refractive Index Nd | Abbe Number vd |
|---|---|---|---|---|
| (Object) | Infinity | Infinity | | |
| 1* | -4.2359 | 0.3689 | 1.639 | 23.25 (vd1) |
| 2* | -4.9581 | 0.1897 | | |
| 3* | 1.1519 | 0.3032 | 1.661 | 20.37 (vd2) |
| 4* | 1.0300 | 0.3566 | | |
| 5 (Stop) | Infinity | 0.0736 | | |
| 6* | 3.1743 | 0.6012 | 1.544 | 55.86 (vd3) |
| 7* | -1.6683 | 0.4407 | | |
| 8* | -1.2266 | 0.3000 | 1.661 | 20.37 (vd4) |
| 9* | -2.7533 | 0.0228 | | |
| 10* | -1.4147 | 0.4493 | 1.535 | 55.66 (vd5) |
| 11* | -1.5033 | 0.0487 | | |
| 12* | 1.3287 | 0.9679 | 1.614 | 25.58 (vd6) |
| 13* | 1.5009 | 0.4000 | | |
| 14 | Infinity | 0.2100 | 1.517 | 64.20 |
| 15 | Infinity | 0.4425 | | |
| Image Plane | Infinity | | | |

TABLE 1-continued

Example 1
Unit mm
f = 2.67
Fno = 2.2
ω(°) = 50.0
ih = 3.26
TTL = 5.10

Constituent Lens Data

| Lens | Start Surface | Focal Length | | Composite Focal Length |
|---|---|---|---|---|
| 1 | 1 | −56.825 | | |
| 2 | 3 | −1482.589 | f12 | −49.119 |
| 3 | 6 | 2.101 | | |
| 4 | 8 | −3.632 | | |
| 5 | 10 | 58.521 | | |
| 6 | 12 | 6.007 | | |

Aspheric Surface Data

| | First Surface | Second Surface | Third Surface | Fourth Surface | Sixth Surface | Seventh Surface |
|---|---|---|---|---|---|---|
| k | −7.569210E+00 | 0.000000E+00 | 0.000000E+00 | 0.000000E+00 | 0.000000E+00 | −4.849741E−01 |
| A4 | 1.908556E−01 | 2.367463E−01 | −9.570454E−02 | −2.376226E−02 | −2.376226E−02 | −1.647497E−01 |
| A6 | −1.564168E−01 | −2.655881E−01 | −2.868712E−01 | −5.126168E−02 | 8.790147E−02 | −2.316727E−02 |
| A8 | 1.043197E−01 | 2.498972E−01 | 4.316098E−01 | 6.789455E−01 | −7.331799E−01 | −2.691108E−01 |
| A10 | −4.681788E−02 | −1.662623E−01 | −8.396602E−01 | −4.202887E+00 | 1.997164E+00 | 1.426761E+00 |
| A12 | 1.262595E−02 | 6.922595E−02 | 9.470486E−01 | 1.412197E+01 | −4.489499E+00 | −3.949564E+00 |
| A14 | −1.767654E−03 | −1.586973E−02 | −4.363544E−01 | −2.305579E+01 | 8.259229E+00 | 4.836672E+00 |
| A16 | 8.897250E−05 | 1.504538E−03 | 3.376562E−02 | 1.814219E+01 | −7.105242E+00 | −2.044674E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | −2.089906E+01 | 0.000000E+00 | 0.000000E+00 | −1.588819E+01 | −8.126016E−01 |
| A4 | −8.536148E−01 | −4.113036E−01 | 1.132747E+00 | −2.270134E−01 | −3.998492E−02 | −2.214474E−01 |
| A6 | 2.233451E+00 | 7.149800E−01 | −2.653945E+00 | 1.275522E+00 | −1.089163E−01 | 9.465310E−02 |
| A8 | −6.766883E+00 | −3.248501E+00 | 3.793494E+00 | −2.027356E+00 | 1.270213E−01 | −3.342639E−02 |
| A10 | 1.857948E+01 | 7.474513E+00 | −3.491914E+00 | 1.659992E+00 | −6.818793E−02 | 8.368758E−03 |
| A12 | −2.886995E+01 | −7.919627E+00 | 2.161844E+00 | −7.094939E−01 | 2.018252E−02 | −1.381228E−03 |
| A14 | 2.302944E+01 | 4.023808E+00 | −8.210451E−01 | 1.441717E−01 | −3.149637E−03 | 1.300845E−04 |
| A16 | −7.369790E+00 | −8.006114E−01 | 1.400137E−01 | −9.630467E−03 | 2.015773E−04 | −5.202592E−06 |

The imaging lens in Example 1 satisfies conditional expressions (1) to (13) as shown in Table 4.

Figure 2:
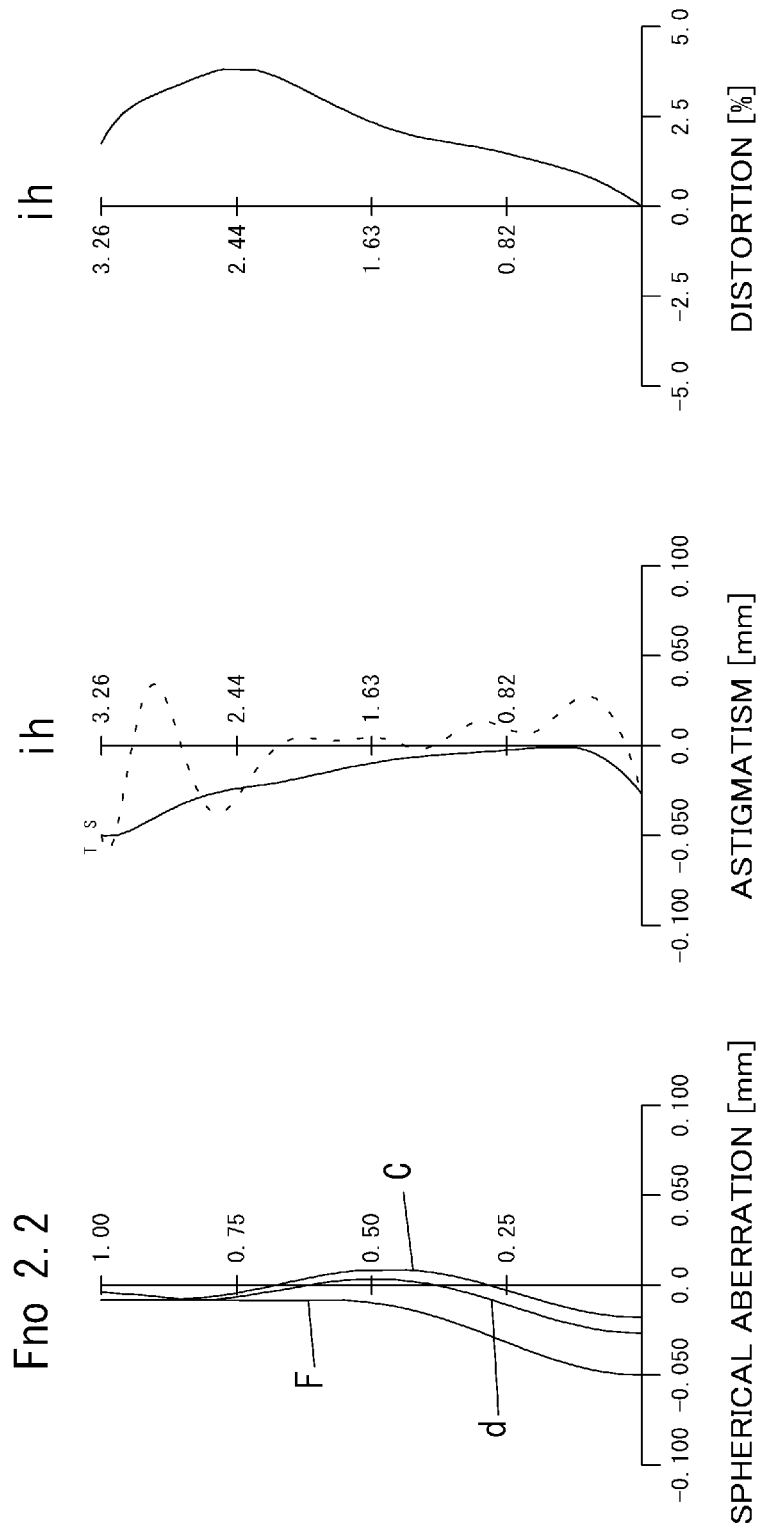
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4 and 6). As shown in FIG. 2, each aberration is corrected excellently.

Example 2

The basic lens data is shown below in Table 2.

TABLE 2

Example 2
Unit mm
f = 2.63
Fno = 2.2
ω(°) = 50.0
ih = 3.26
TTL = 4.93

Surface Data

| Surface Number i | Curvature Radius r | Surface Distance d | Refractive Index Nd | Abbe Number vd |
|---|---|---|---|---|
| (Object) | Infinity | Infinity | | |
| 1* | −5.1321 | 0.3830 | 1.639 | 23.25 (vd1) |
| 2* | −6.5775 | 0.1287 | | |
| 3* | 1.1425 | 0.2991 | 1.661 | 20.37 (vd2) |
| 4* | 1.0223 | 0.3754 | | |
| 5 (Stop) | Infinity | 0.0672 | | |
| 6* | 3.1398 | 0.5902 | 1.544 | 55.86 (vd3) |
| 7* | −1.5854 | 0.4510 | | |
| 8* | −1.1845 | 0.3000 | 1.661 | 20.37 (vd4) |

TABLE 2-continued

Example 2
Unit mm
f = 2.63
Fno = 2.2
ω(°) = 50.0
ih = 3.26
TTL = 4.93

| | | | | |
|---|---|---|---|---|
| 9* | −2.4107 | 0.0504 | | |
| 10* | −1.3450 | 0.4066 | 1.535 | 55.66 (vd5) |
| 11* | −1.5251 | 0.0200 | | |
| 12* | 1.2408 | 0.8962 | 1.614 | 25.58 (vd6) |
| 13* | 1.3629 | 0.4000 | | |
| 14 | Infinity | 0.2100 | 1.517 | 64.20 |
| 15 | Infinity | 0.4286 | | |
| Image Plane | Infinity | | | |

Constituent Lens Data

| Lens | Start Surface | Focal Length | | Composite Focal Length |
|---|---|---|---|---|
| 1 | 1 | −40.754 | f12 | −35.599 |
| 2 | 3 | −1480.894 | | |
| 3 | 6 | 2.025 | | |
| 4 | 8 | −3.904 | | |
| 5 | 10 | −99.756 | | |
| 6 | 12 | 5.945 | | |

Aspheric Surface Data

| | First Surface | Second Surface | Third Surface | Fourth Surface | Sixth Surface | Seventh Surface |
|---|---|---|---|---|---|---|
| k | −1.817491E+01 | 0.000000E+00 | 0.000000E+00 | 0.000000E+00 | 0.000000E+00 | −1.882321E−01 |
| A4 | 2.169300E−01 | 2.760606E−01 | −1.633671E−01 | −2.789724E−01 | −2.311904E−02 | −1.868436E−01 |
| A6 | −2.044728E−01 | −3.769306E−01 | −1.334469E−01 | 3.433659E−01 | −2.467144E−01 | 5.277028E−02 |
| A8 | 1.578102E−01 | 4.046169E−01 | −4.875305E−01 | −3.499424E−01 | 1.993419E+00 | −5.722112E−01 |
| A10 | −8.201430E−02 | −2.858376E−01 | 1.819717E+00 | −6.487926E+00 | −1.116826E+01 | 2.128245E+00 |
| A12 | 2.707716E−02 | 1.203639E−01 | −2.801462E+00 | 3.830395E+01 | 3.101390E+01 | −4.465361E+00 |
| A14 | −5.246273E−03 | −2.769246E−02 | 2.182264E+00 | −8.069989E+01 | −4.097793E+01 | 4.277189E+00 |
| A16 | 4.467945E−04 | 2.696449E−03 | −6.862093E−01 | 6.565273E+01 | 1.983074E+01 | −1.280730E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | −2.089905E+01 | 0.000000E+00 | 0.000000E+00 | −1.588819E+01 | −9.109162E−01 |
| A4 | −9.528093E−01 | −4.878227E−01 | 1.495585E+00 | −1.525222E−01 | −5.922317E−02 | −2.863073E−01 |
| A6 | 3.092423E+00 | 1.188854E+00 | −3.519234E+00 | 1.642551E+00 | −2.202408E−01 | 1.446508E−01 |
| A8 | −1.096615E+01 | −6.126587E+00 | 4.215430E+00 | −3.630374E+00 | 2.909752E−01 | −5.508812E−02 |
| A10 | 3.151884E+01 | 1.454528E+01 | −2.976992E+00 | 3.813803E+00 | −1.668678E−01 | 1.418476E−02 |
| A12 | −4.961779E+01 | −1.596661E+01 | 1.549548E+00 | −2.079363E+00 | 5.170383E−02 | −2.335886E−03 |
| A14 | 3.938667E+01 | 8.402463E+00 | −6.243346E−01 | 5.706780E−01 | −8.459550E−03 | 2.196924E−04 |
| A16 | −1.243537E+01 | −1.728885E+00 | 1.292875E−01 | −6.220736E−02 | 5.686897E−04 | −8.980117E−06 |

The imaging lens in Example 2 satisfies conditional expressions (1) to (13) as shown in Table 4.

Figure 4:
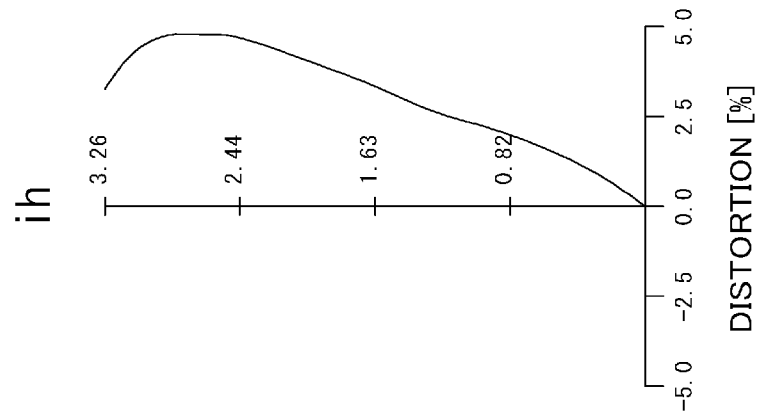
FIG. 4 shows spherical aberration, astigmatism, and distortion of the imaging lens in Example 2 according to the present invention.
Figure 4:
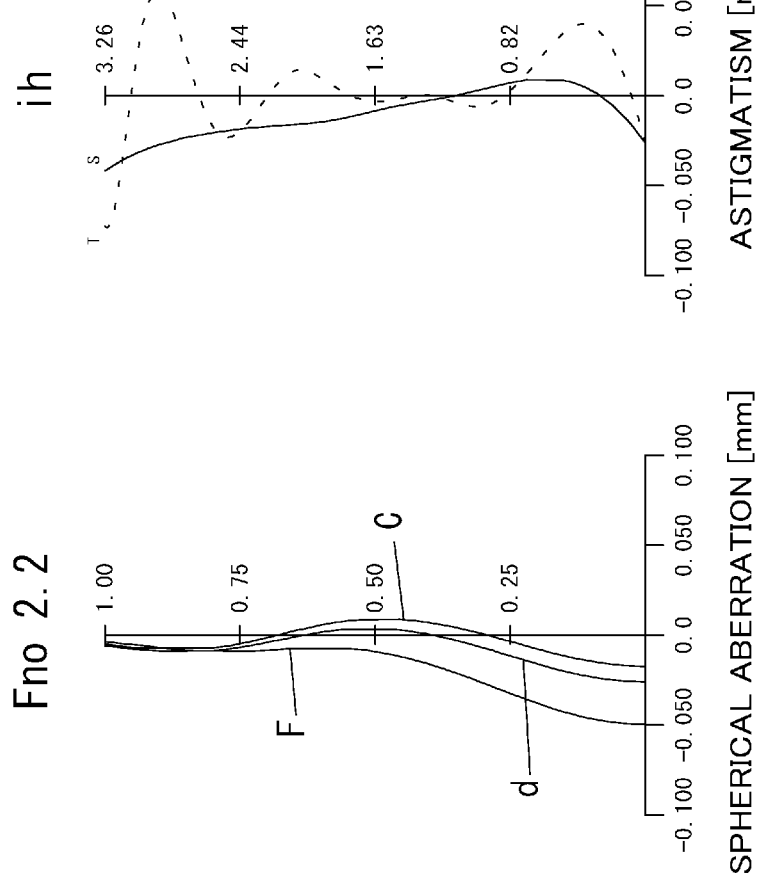

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm
f = 2.99
Fno = 2.2
ω(°) = 46.0
ih = 3.26
TTL = 5.32

Surface Data

| Surface Number i | Curvature Radius r | Surface Distance d | Refractive Index Nd | Abbe Number vd |
|---|---|---|---|---|
| (Object) | Infinity | Infinity | | |
| 1* | −4.3720 | 0.3917 | 1.639 | 23.25 (vd1) |
| 2* | −5.1973 | 0.0339 | | |
| 3* | 1.1605 | 0.3073 | 1.661 | 20.37 (vd2) |

TABLE 3-continued

Example 3
Unit mm
f = 2.99
Fno = 2.2
ω(°) = 46.0
ih = 3.26
TTL = 5.32

| | | | | |
|---|---|---|---|---|
| 4* | 1.0358 | 0.4194 | | |
| 5 (Stop) | Infinity | 0.1437 | | |
| 6* | 3.2153 | 0.6312 | 1.544 | 55.86 (vd3) |
| 7* | −1.6899 | 0.4741 | | |
| 8* | −1.1307 | 0.3186 | 1.661 | 20.37 (vd4) |
| 9* | −1.9131 | 0.0746 | | |
| 10* | −1.2820 | 0.4709 | 1.535 | 55.66 (vd5) |
| 11* | −1.4454 | 0.0200 | | |
| 12* | 1.4610 | 0.8306 | 1.614 | 25.58 (vd6) |
| 13* | 1.4206 | 0.4000 | | |
| 14 | Infinity | 0.2100 | 1.517 | 64.20 |
| 15 | Infinity | 0.6646 | | |
| Image Plane | Infinity | | | |

Constituent Lens Data

| Lens | Start Surface | Focal Length | | Composite Focal Length |
|---|---|---|---|---|
| 1 | 1 | −52.867 | f12 | −44.317 |
| 2 | 3 | −730.929 | | |
| 3 | 6 | 2.132 | | |
| 4 | 8 | −4.993 | | |
| 5 | 10 | 4791.630 | | |
| 6 | 12 | 12.258 | | |

Aspheric Surface Data

| | First Surface | Second Surface | Third Surface | Fourth Surface | Sixth Surface | Seventh Surface |
|---|---|---|---|---|---|---|
| k | −9.991950E+00 | 0.000000E+00 | 0.000000E+00 | 0.000000E+00 | 0.000000E+00 | −8.600950E−01 |
| A4 | 2.454532E−01 | 3.029836E−01 | −1.858055E−01 | −3.282448E−01 | −3.149952E−02 | −1.672252E−01 |
| A6 | −2.659715E−01 | −5.025882E−01 | −1.491647E−01 | 4.038303E−01 | −4.169246E−02 | −9.540866E−02 |
| A8 | 2.359187E−01 | 6.800499E−01 | −1.011986E−01 | −9.749097E−01 | 3.192162E−02 | 6.463326E−01 |
| A10 | −1.415844E−01 | −6.282706E−01 | 8.913356E−01 | 5.237332E−01 | −4.459141E−01 | −2.507334E+00 |
| A12 | 5.145611E−02 | 3.519436E−01 | −1.702356E+00 | 5.897148E+00 | 8.817130E−01 | 5.080458E+00 |
| A14 | −1.012179E−02 | −1.066821E−01 | 1.505980E+00 | −1.540615E+01 | −7.717792E−01 | −5.362281E+00 |
| A16 | 8.071564E−04 | 1.334774E−02 | −5.086274E−01 | 1.347634E+01 | 4.645366E−01 | 2.353247E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | −1.864613E+01 | 0.000000E+00 | 0.000000E+00 | −1.588821E+01 | −1.788249E+00 |
| A4 | −5.142600E−01 | −1.896724E−01 | 1.496952E+00 | 1.237207E−01 | −2.710034E−02 | −2.807268E−01 |
| A6 | 5.989527E−01 | −6.304493E−01 | −3.944496E+00 | 3.834365E−01 | −3.156474E−01 | 1.996027E−01 |
| A8 | −1.404650E−01 | 1.046073E+00 | 7.078588E+00 | −4.024719E−01 | 6.561470E−01 | −1.006005E−01 |
| A10 | 1.655739E+00 | −4.212104E−01 | −8.891211E+00 | −2.487491E−01 | −6.819475E−01 | 3.203550E−02 |
| A12 | −3.043188E+00 | 8.726636E−02 | 7.140681E+00 | 5.497054E−01 | 3.776031E−01 | −6.140247E−03 |
| A14 | 2.109249E+00 | −1.124756E−01 | −3.239592E+00 | −2.943441E−01 | −1.070556E−01 | 6.427443E−04 |
| A16 | −5.133556E−01 | 5.399278E−02 | 6.332262E−01 | 5.423131E−02 | 1.216009E−02 | −2.839846E−05 |

The imaging lens in Example 3 satisfies conditional expressions (1) to (13) as shown in Table 4.

Figure 6:
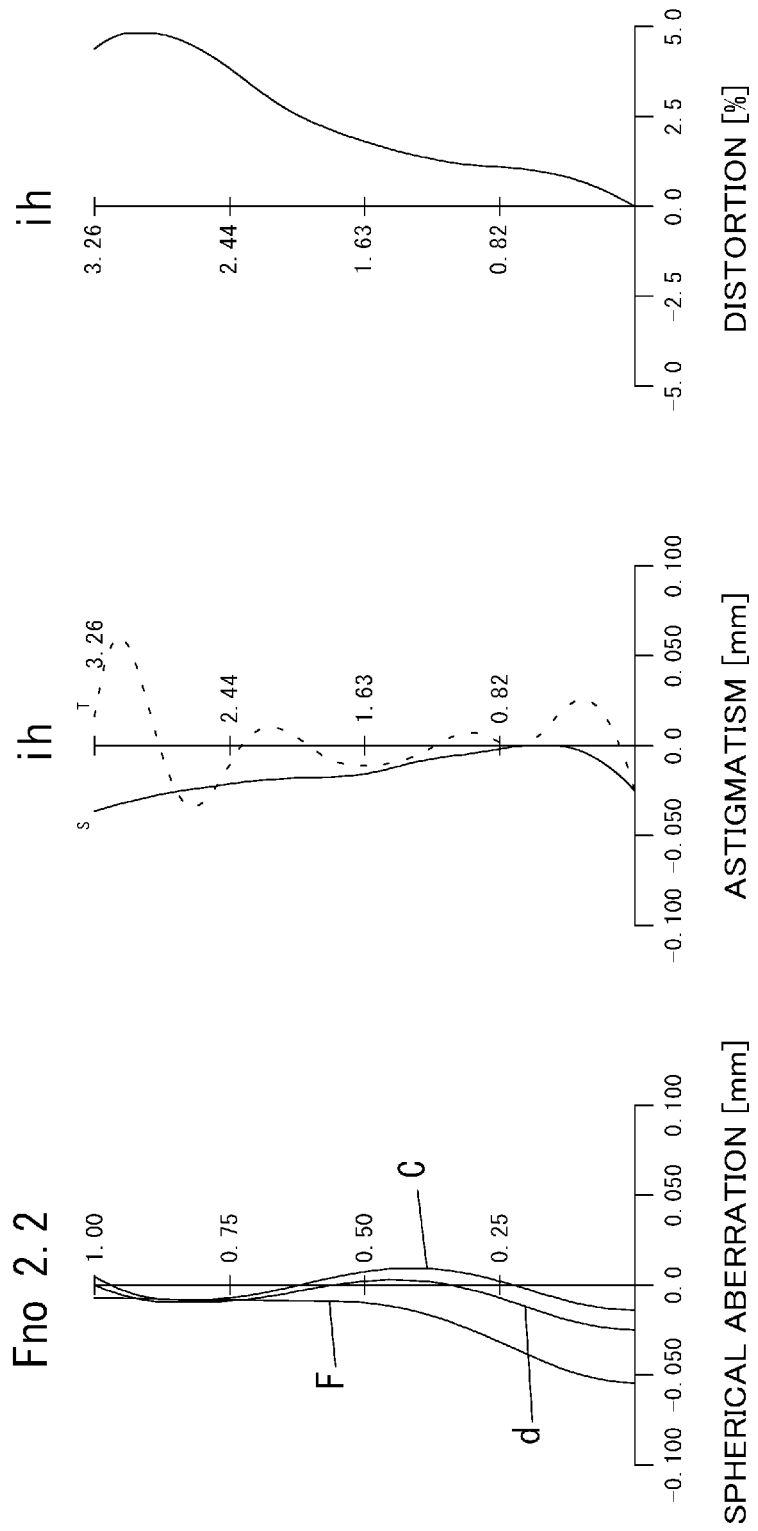
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

Example 4

In table 4, values of conditional expressions (1) to (13) related to the Examples 1 to 3 are shown.

TABLE 4

| | Conditional Expression | Example 1 | Example 2 | Example 3 |
|---|---|---|---|---|
| (1) | vd1/(vd2 + vd3) | 0.31 | 0.31 | 0.31 |
| (2) | vd4/vd5 | 0.37 | 0.37 | 0.37 |
| (3) | f1/f | −21.27 | −15.49 | −17.67 |

TABLE 4-continued

| | Conditional Expression | Example 1 | Example 2 | Example 3 |
|---|---|---|---|---|
| (4) | f12/f | −18.38 | −13.53 | −14.81 |
| (5) | f3/f | 0.79 | 0.77 | 0.71 |
| (6) | f4/f | −1.36 | −1.48 | −1.67 |
| (7) | |f5|/f | 21.90 | 37.91 | 1601.26 |
| (8) | f6/f | 2.25 | 2.26 | 4.10 |
| (9) | (D4/TTL) * 100 | 5.88 | 6.08 | 5.99 |
| (10) | Σ(L1F − L6R)/f | 1.54 | 1.51 | 1.38 |
| (11) | T2/T3 | 0.98 | 0.98 | 1.19 |
| (12) | r12/f | 0.56 | 0.52 | 0.47 |
| (13) | Fno | 2.20 | 2.20 | 2.20 |

When the imaging lens according to the present invention is adopted to a product with the camera function, there is realized contribution to the wide field of view, the low-profileness and the low F-number of the camera and also high performance thereof.

DESCRIPTION OF REFERENCE NUMERALS

ST: aperture stop,
L1: first lens,
L2: second lens,
L3: third lens,
L4: fourth lens,
L5: fifth lens,
L6: sixth lens,
ih: maximum image height,
IR: filter, and
IMG: image plane,

What is claimed is:

1. An imaging lens comprising in order from an object side to an image side,
   a first lens having negative refractive power, an object-side surface of said first lens having a concave surface facing the object side near an optical axis of the imaging lens,
   a second lens having a negative refractive power,
   a third lens,
   a fourth lens having a negative refractive power and a convex surface facing the image side near the optical axis,
   a fifth lens having at least one aspheric surface, and
   a sixth lens being a double-sided aspheric lens and having a concave surface facing the image side near the optical axis, wherein the image-side surface of said sixth lens is an aspheric surface changing to the convex surface at a peripheral area.

2. The imaging lens according to claim 1, wherein an image-side surface of said first lens has a convex surface facing the image side near the optical axis.

3. The imaging lens according to claim 2, wherein the image-side surface of said first lens is an aspheric surface changing to the concave surface at the peripheral area.

4. The imaging lens according to claim 1, wherein the object-side surface of said first lens is an aspheric surface changing to the convex surface at the peripheral area.

5. The imaging lens according to claim 1, wherein
   said second lens has a meniscus shape having a concave surface facing the image side near the optical axis,
   said third lens has a biconvex shape having convex surfaces facing both sides near the optical axis,
   said fourth lens has a meniscus shape having a concave surface facing the object side near the optical axis, and
   said fifth lens has a meniscus shape having a concave surface facing the object side near the optical axis.

6. The imaging lens according to claim 1, wherein an object-side surface of said sixth lens is a convex surface facing the object side near the optical axis and the aspheric surface changing from the convex surface to the concave surface at the peripheral area.

7. The imaging lens according to claim 1, wherein a below conditional expression (1) is satisfied:

$$0.15 < vd1/(vd2+vd3) < 0.50 \quad (1)$$

where
vd1: abbe number at d-ray of the first lens,
vd2: abbe number at d-ray of the second lens, and
vd3: abbe number at d-ray of the third lens.

8. The imaging lens according to claim 1, wherein a below conditional expression (2) is satisfied:

$$0.15 < vd4/vd5 < 0.55 \quad (2)$$

where
vd4: abbe number at d-ray of the fourth lens, and
vd5: abbe number at d-ray of the fifth lens.

9. The imaging lens according to claim 1, wherein a below conditional expression (3) is satisfied:

$$-32 < f1/f < -7 \quad (3)$$

where
f1: focal length of the first lens, and
f: focal length of the overall optical system of the imaging lens.

10. The imaging lens according to claim 1, wherein a below conditional expression (4) is satisfied:

$$-28 < f12/f < -6 \quad (4)$$

where
f12: composite focal length of the first lens and the second lens, and
f: focal length of the overall optical system of the imaging lens.

11. The imaging lens according to claim 1, wherein a below conditional expression (5) is satisfied:

$$0.35 < f3/f < 1.20 \quad (5)$$

where
f3: focal length of the third lens, and
f: focal length of the overall optical system of the imaging lens.

12. The imaging lens according to claim 1, wherein a below conditional expression (6) is satisfied:

$$-2.5 < f4/f < -0.6 \quad (6)$$

where
f4: focal length of the fourth lens, and
f: focal length of the overall optical system of the imaging lens.

13. The imaging lens according to claim 1, wherein a below conditional expression (7) is satisfied:

$$10 < |f5|/f \quad (7)$$

where
f5: focal length of the fifth lens, and
f: focal length of the overall optical system of the imaging lens.

14. The imaging lens according to claim 1, wherein a below conditional expression (8) is satisfied:

$$1.0 < f6/f < 6.5 \quad (8)$$

where
f6: focal length of the sixth lens, and
f: focal length of the overall optical system of the imaging lens.

15. The imaging lens according to claim 1, wherein a below conditional expression (9) is satisfied:

$$2 < (D4/TTL) \times 100 < 10 \quad (9)$$

where
D4: thickness along the optical axis of the fourth lens, and
TTL: distance along the optical axis from an object-side surface of the first lens to an image plane.

16. The imaging lens according to claim 1, wherein a below conditional expression (10) is satisfied:

$$0.6 < \Sigma(L1F-L6R)/f < 2.4 \quad (10)$$

where
$\Sigma(L1F-L6R)$: distance along the optical axis from the object-side surface of the first lens to the image-side surface of the sixth lens, and f: focal length of the overall optical system of the imaging lens.

17. The imaging lens according to claim 1, wherein a below conditional expression (11) is satisfied:

$$0.40 < T2/T3 < 1.80 \qquad (11)$$

where

T2: distance along the optical axis from the image-side surface of the second lens to the object-side surface of the third lens, and T3: distance along the optical axis from the image-side surface of the third lens to the object-side surface of the fourth lens.

18. The imaging lens according to claim 1, wherein a below conditional expression (12) is satisfied:

$$0.2 < r12/f < 0.9 \qquad (12)$$

where r12: paraxial curvature radius of the image-side surface of the sixth lens, and f: focal length of the overall optical system of the imaging lens.

19. The imaging lens according to claim 1, wherein a below conditional expression (13) is satisfied:

$$Fno \leq 2.4 \qquad (13)$$

where

Fno: F-number.

* * * * *